(12) United States Patent
Chen et al.

(10) Patent No.: US 12,455,315 B2
(45) Date of Patent: Oct. 28, 2025

(54) CHIP WITH POWER-GLITCH DETECTION AND POWER-GLITCH SELF-TESTING

(71) Applicant: MEDIATEK INC., Hsinchu (TW)

(72) Inventors: Pin-Wen Chen, Hsinchu (TW); Kuan-Chung Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 257 days.

(21) Appl. No.: 18/057,315

(22) Filed: Nov. 21, 2022

(65) Prior Publication Data

US 2023/0213579 A1 Jul. 6, 2023

Related U.S. Application Data

(60) Provisional application No. 63/376,628, filed on Sep. 22, 2022, provisional application No. 63/296,503, filed on Jan. 5, 2022.

(51) Int. Cl.
    *G01R 31/317* (2006.01)
(52) U.S. Cl.
    CPC .. *G01R 31/31721* (2013.01); *G01R 31/31704* (2013.01); *G01R 31/31706* (2013.01); *G01R 31/31713* (2013.01); *G01R 31/31719* (2013.01)
(58) Field of Classification Search
    CPC ........ G01R 31/31721; G01R 31/31704; G01R 31/31706; G01R 31/31713
    See application file for complete search history.

(56) References Cited

U.S. PATENT DOCUMENTS

| | | | |
|---|---|---|---|
| 10,466,275 B1* | 11/2019 | Vundavalli | G01R 22/066 |
| 2007/0120584 A1 | 5/2007 | Carlile et al. | |
| 2012/0130657 A1* | 5/2012 | Eckert | G01R 31/2851 |
| | | | 702/61 |
| 2017/0032125 A1 | 2/2017 | Lee et al. | |
| 2017/0357829 A1* | 12/2017 | Park | G06F 21/86 |
| 2021/0174888 A1* | 6/2021 | Sinha | G11C 29/44 |
| 2021/0333334 A1 | 10/2021 | Staudenmaier et al. | |
| 2021/0396789 A1* | 12/2021 | Lentz | G01R 31/31816 |

FOREIGN PATENT DOCUMENTS

| | | |
|---|---|---|
| CN | 106405208 A | 2/2017 |
| CN | 113533830 A | 10/2021 |

OTHER PUBLICATIONS

Extended European Search Report dated Jun. 6, 2023, issued in application No. EP 23150342.6.
Chinese language office action dated Dec. 19, 2023, issued in application No. TW 112100145.

* cited by examiner

*Primary Examiner* — Dominic E Hawkins
(74) *Attorney, Agent, or Firm* — McClure, Qualey & Rodack, LLP (57) ABSTRACT

Power-glitch detection and power-glitch self-testing within a chip is shown. In a chip, a processor has a power terminal, a glitch detector, and a self-testing circuit. The power terminal is configured to receive power. The glitch detector is coupled to the power terminal of the processor for power-glitch detection. The self-testing circuit has a glitch generator and a glitch controller. The glitch controller controls the glitch generator to generate a self-testing glitch signal within the chip to test the glitch detector.

20 Claims, 7 Drawing Sheets

CHIP WITH POWER-GLITCH DETECTION AND POWER-GLITCH SELF-TESTING

CROSS REFERENCE TO RELATED APPLICATIONS

This application claims the benefit of U.S. Provisional Application No. 63/296,503, filed Jan. 5, 2022, and U.S. Provisional Application No. 63/376,628, filed Sep. 22, 2022, the entirety of which are incorporated by reference herein.

BACKGROUND OF THE INVENTION

Field of the Invention

The present invention relates to power-glitch detection and power-glitch self-testing on a chip.

Description of the Related Art

Today, hackers are known to employ power-glitch attacks, which is a sophisticated attack that aims to confuse a chip in an electronic device into revealing its secrets.

How to detect such malicious attacks is an important issue in the system-on-chip (SoC) design.

BRIEF SUMMARY OF THE INVENTION

Technologies related to power-glitch detection and power-glitch self-testing on a chip are shown.

A chip with power-glitch detection and power-glitch self-testing in accordance with an exemplary embodiment of the present invention includes a processor, a glitch detector, and a self-testing circuit. The processor has a power terminal configured to receive power. The glitch detector is coupled to the power terminal of the processor for power-glitch detection. The self-testing circuit includes a glitch generator and a glitch controller. The glitch controller controls the glitch generator to generate a self-testing glitch signal within the chip to test the glitch detector.

The disclosed self-testing glitch signal is generated by the chip itself. No additional test pad is required to test the glitch detector.

In an exemplary embodiment, the chip has a multiplexer. The multiplexer couples the power terminal of the processor to the glitch detector while in a normal mode, and the self-testing glitch signal is coupled to the glitch detector while in a power-glitch self-testing mode.

In an exemplary embodiment, the glitch controller includes a phase-locked loop that generates a clock signal, and the glitch controller operates according to the clock signal. A sharp signal, therefore, can be generated for use as a self-testing glitch signal.

In an exemplary embodiment, the glitch controller further comprises shift registers and a pulse generator. The shift registers operate according to the clock signal generated by the phase-locked loop. The pulse generator is driven by the shift registers to generate a pulse signal that is sent to the glitch generator to determine the pulse width of the self-testing glitch signal.

In an exemplary embodiment, the glitch generator comprises a voltage divider that provides a plurality of voltage selections, and a plurality of switches for selecting one of the voltage selections as the self-testing glitch signal. The glitch controller controls the switches of the glitch generator to turn on a selected switch according to the pulse signal.

In an exemplary embodiment, the self-testing glitch signal is fed back to the glitch controller for verification, and the glitch controller presents an error flag to indicate an error of the self-testing glitch signal.

In an exemplary embodiment, the glitch controller generates a first trigger signal and a second trigger signal dependent on the pulse signal to detect a rising transition of an inverted signal of the self-testing glitch signal and a rising transition of the self-testing glitch signal. When the rising transition of the inverted signal of the self-testing glitch signal is detected based on the first trigger signal and the rising transition of the self-testing glitch signal is detected based on the second trigger signal, the error flag is de-asserted to show that the self-testing glitch signal works well.

In an exemplary embodiment, the glitch controller has a first D-flip-flop, a second D-flip-flop, a third D-flip-flop, and an AND gate. The first D-flip-flop has a D terminal receiving the inverted signal of the self-testing glitch signal, and a clock terminal receiving the first trigger signal. The second D-flip-flop has a D terminal receiving the self-testing glitch signal, and a clock terminal receiving the second trigger signal. A Q terminal of the first D-flip-flop and a Q terminal of the second D-flip-flop are coupled to input terminals of the AND gate. The third D-flip-flop has a D terminal tied high. The third D-flip-flop has a clock terminal receiving an output of the AND gate, and a QB terminal showing the error flag.

In an exemplary embodiment, the chip further has a test pad and a security switch. The security switch is coupled between the test pad and a self-testing glitch input terminal of the multiplexer. When the enable signal is de-asserted to disable the use of the test pad, the security switch blocks external glitch signals from entering through the test pad.

In an exemplary embodiment, the chip further has a variable resistor, coupled between the power terminal of the chip and the self-testing glitch input terminal of the multiplexer for IR compensation.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
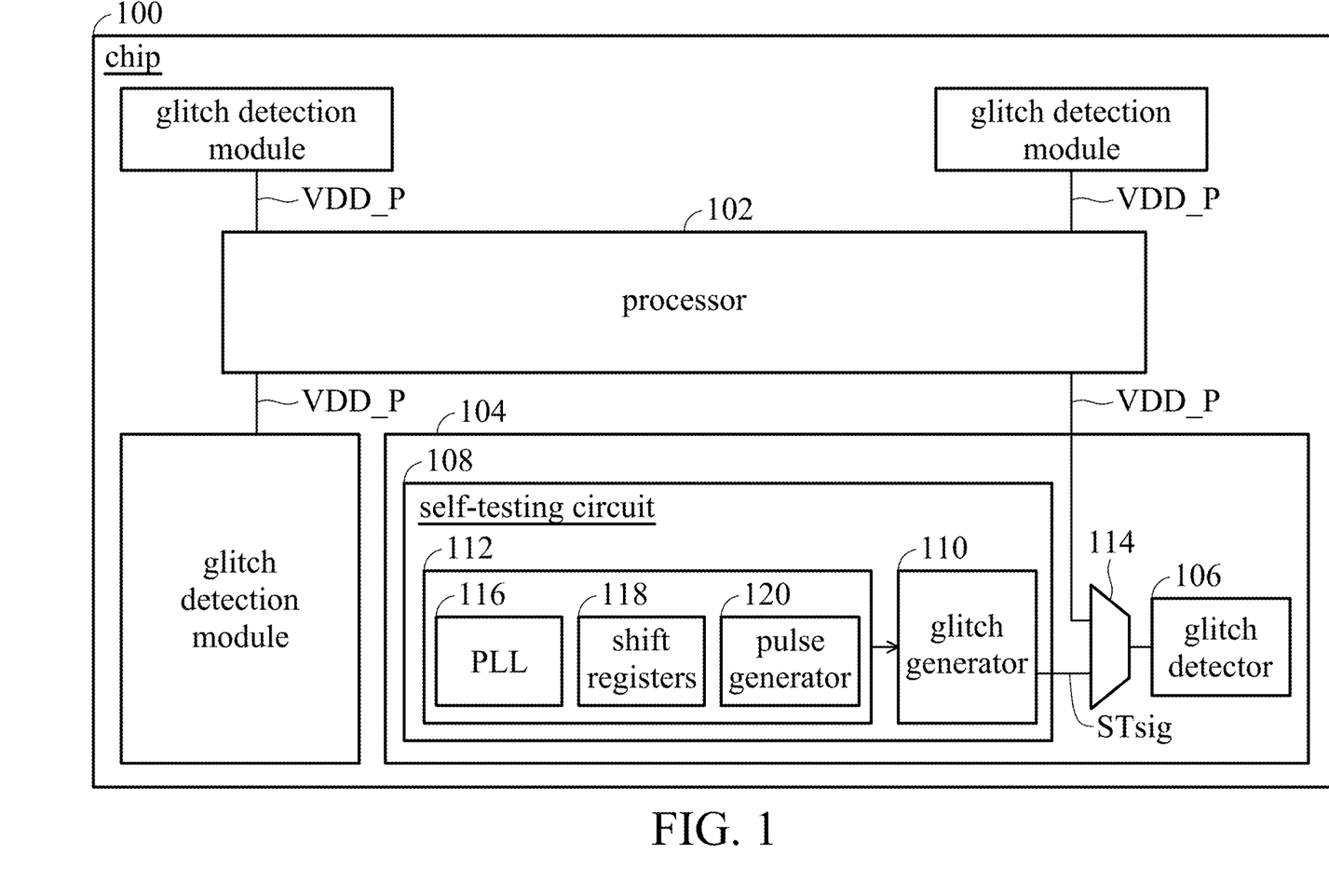
FIG. 1 depicts a chip 100 in accordance with an exemplary embodiment of the present invention.

FIG. 1 depicts a chip 100 in accordance with an exemplary embodiment of the present invention, which has a processor 102 (e.g., a central processing unit CPU, a tensor processing unit TPU, and so on) and a glitch detection design. The processor 102 may have multiple power terminals VDD_P configured to receive power. Each power terminal VDD_P may be coupled a glitch detection module.

The glitch detection module 104 includes a glitch detector 106 and a self-testing circuit 108. In addition to being coupled to the power terminal VDD_P to detect glitches that may be a hacker's attack, the glitch detector 106 can be tested by the self-testing circuit 108. The self-testing circuit 108 has a glitch generator 110 and a glitch controller 112. The glitch controller 112 controls the glitch generator 110 to generate a self-testing glitch signal STsig within the chip 100 to test the glitch detector 106.

Because the testing of the glitch detector 106 is embedded within the chip 100, there is no need to design an additional test pad to receive an external glitch-testing signal to test the glitch detector 106. Thus, there is no need to provide complex trace routing to transfer the external glitch-testing signal to the different glitch detectors.

In some exemplary embodiments, the proposed chip is a system-on-chip (SoC) design, and may have more than one processor embedded in it. The power terminals of the different processors may each be coupled to one glitch detection module (104) for glitch detection and for self-testing of the glitch detection.

In FIG. 1, each glitch detection module 104 has a multiplexer 114, coupling the power terminal VDD_P of the processor 102 to the glitch detector 106 while in the normal mode, and coupling the self-testing glitch signal STsig to the glitch detector 106 when in the power-glitch self-testing mode.

The self-testing circuit 108 has a phase-locked loop (PLL) 116, shift registers 118, and a pulse generator 120. The PLL 116 generates a clock signal. The glitch controller 112 operates according to the clock signal. Because PLL 116 is a high-frequency component, the self-testing glitch signal STsig generated based on the PLL 116 can be very sharp (e.g., with a very short pulse width 2.5 ns-40.96 us), even sharper than an external glitch-testing signal generated by an external professional glitch amplifier.

In this example, the shift registers 118 operate according to the clock signal generated by the phase-locked loop 116. The pulse generator 120 is driven by the shift registers 118 to generate a pulse signal that is sent to the glitch generator 110 to determine the pulse width of the self-testing glitch signal STsig.

Figure 2:
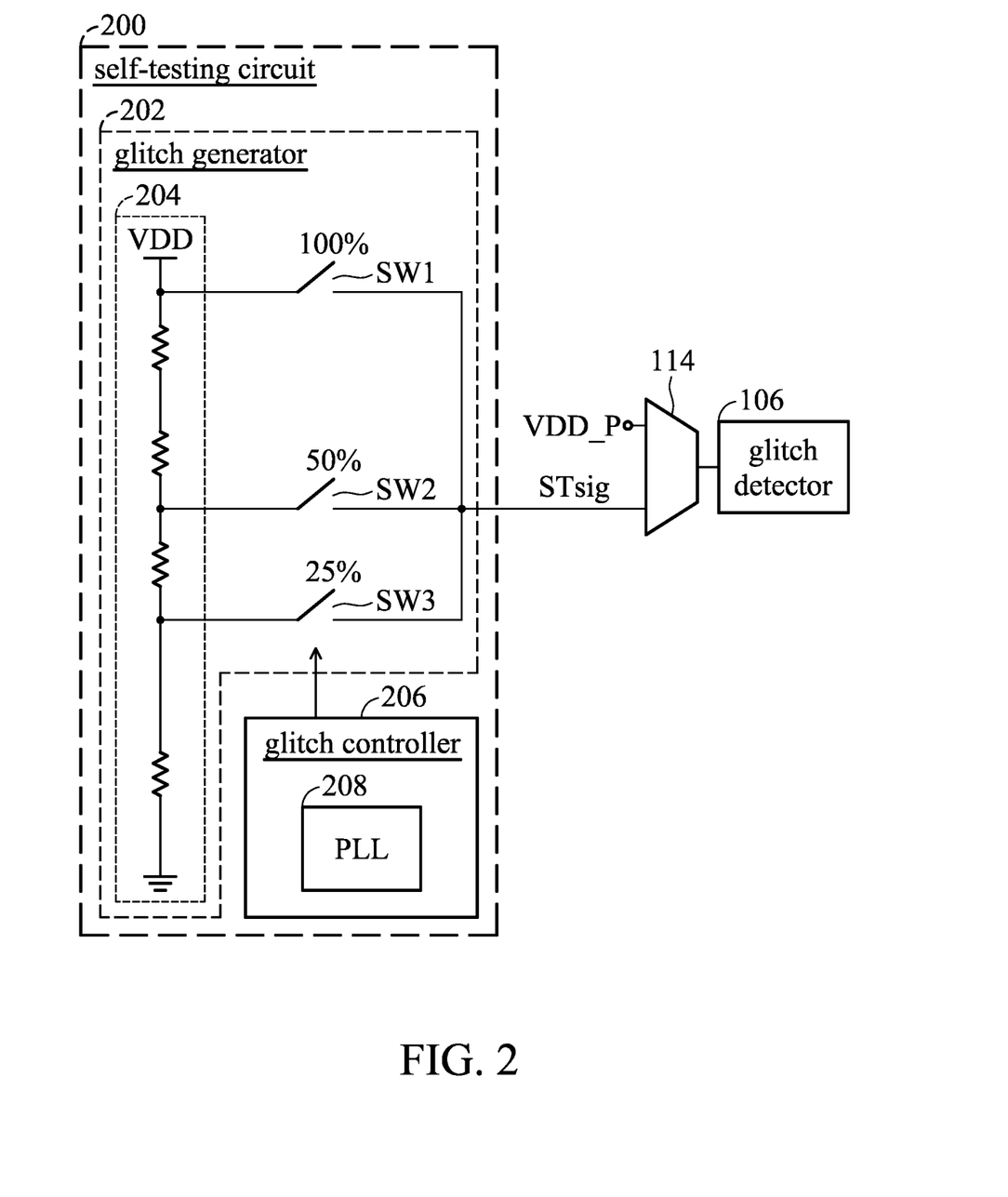
FIG. 2 depicts a self-testing circuit 200 in accordance with an exemplary embodiment.

In an exemplary embodiment, the self-testing glitch signal STsig may have different magnitudes. FIG. 2 depicts a self-testing circuit 200 in accordance with such an exemplary embodiment.

The glitch generator 202 comprises a voltage divider 204 that provides a plurality of voltage selections (100% or 50% or 25% VDD), and a plurality of switches (SW1, SW2, and SW3) for selecting one of the voltage selections for use as the self-testing glitch signal STsig. The glitch controller 206 controls the switches (SW1, SW2, and SW3) of the glitch generator 202 so that a selected switch can be turned on by a pulse signal that was generated based on the phase-locked loop (PLL) 208 of the glitch controller 206. The various magnitude selections of the self-testing glitch signal STsig can guarantee the sensitivity of the glitch detector 106.

Figure 3:
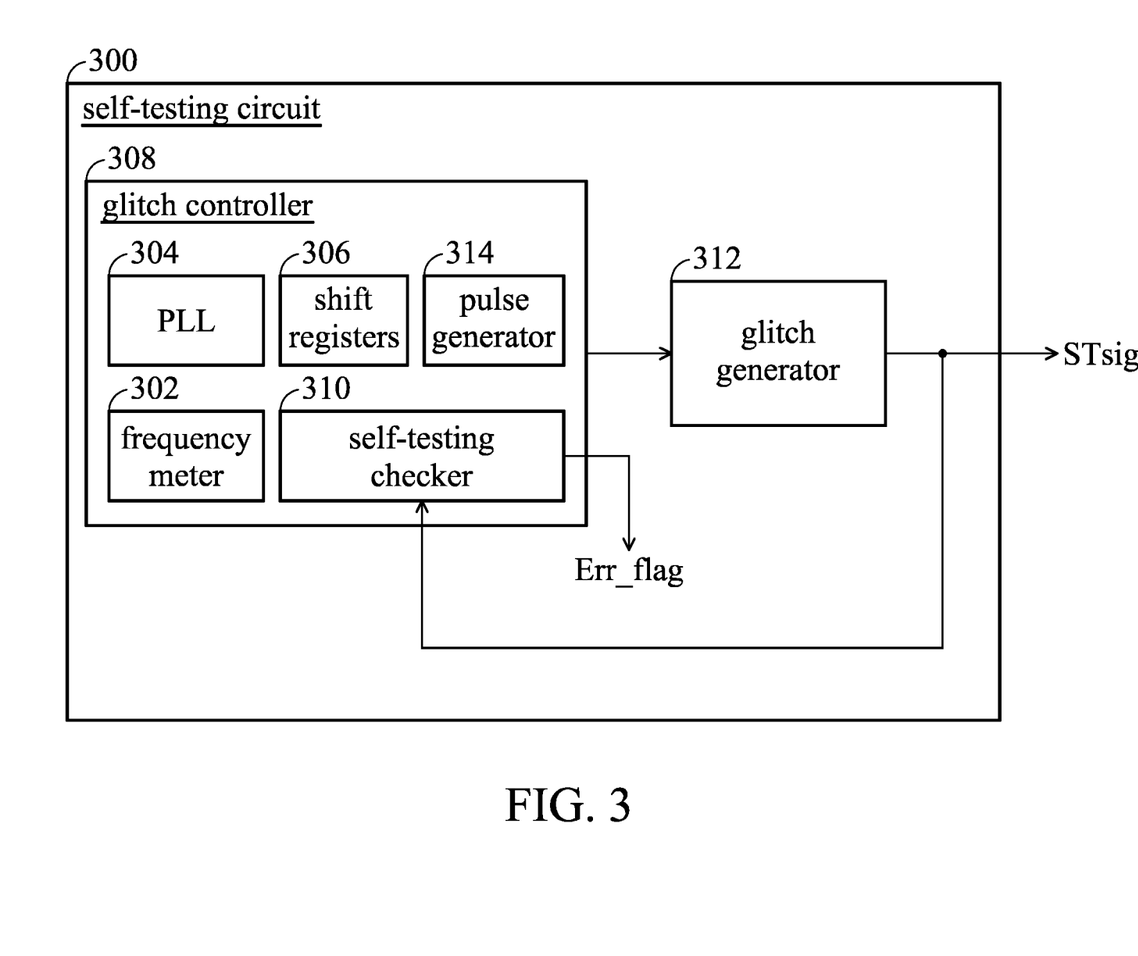
FIG. 3 depicts a self-testing circuit 300 with circuit verification in accordance with an exemplary embodiment of the present invention.

FIG. 3 depicts a self-testing circuit 300 with circuit verification in accordance with an exemplary embodiment of the present invention.

The self-testing circuit 300 has a frequency meter 302, configured to monitor malfunctions of the phase-locked loop (PLL) 304 or the shift registers 306 within the glitch controller 308.

The self-testing circuit 300 has a self-testing checker 310. The self-testing glitch signal STsig generated by the glitch generator 312 is fed back to the self-testing checker 310 of the glitch controller 308 for verification. The glitch controller 308 presents an error flag Err_falg when there is an error of the self-testing glitch signal STsig.

In an exemplary embodiment, the glitch controller 308 may generate a first trigger signal (Trg1) and a second trigger signal (Trg2) that are dependent on a pulse signal 314 (which is generated to control the pulse width of the self-testing glitch signal STsig generated by the glitch generator 312) to detect a rising transition of an inverted signal (STsigB) of the self-testing glitch signal STsig and a rising transition of the self-testing glitch signal STsig. When the rising transition of the inverted signal STsigB of the self-testing glitch signal STsig is detected based on the first trigger signal (Trg1) and the rising transition of the self-testing glitch signal STsig is detected based on the second trigger signal (Trg2), the error flag Err_falg is de-asserted to show that the self-testing glitch signal STsig works well.

Figure 4:
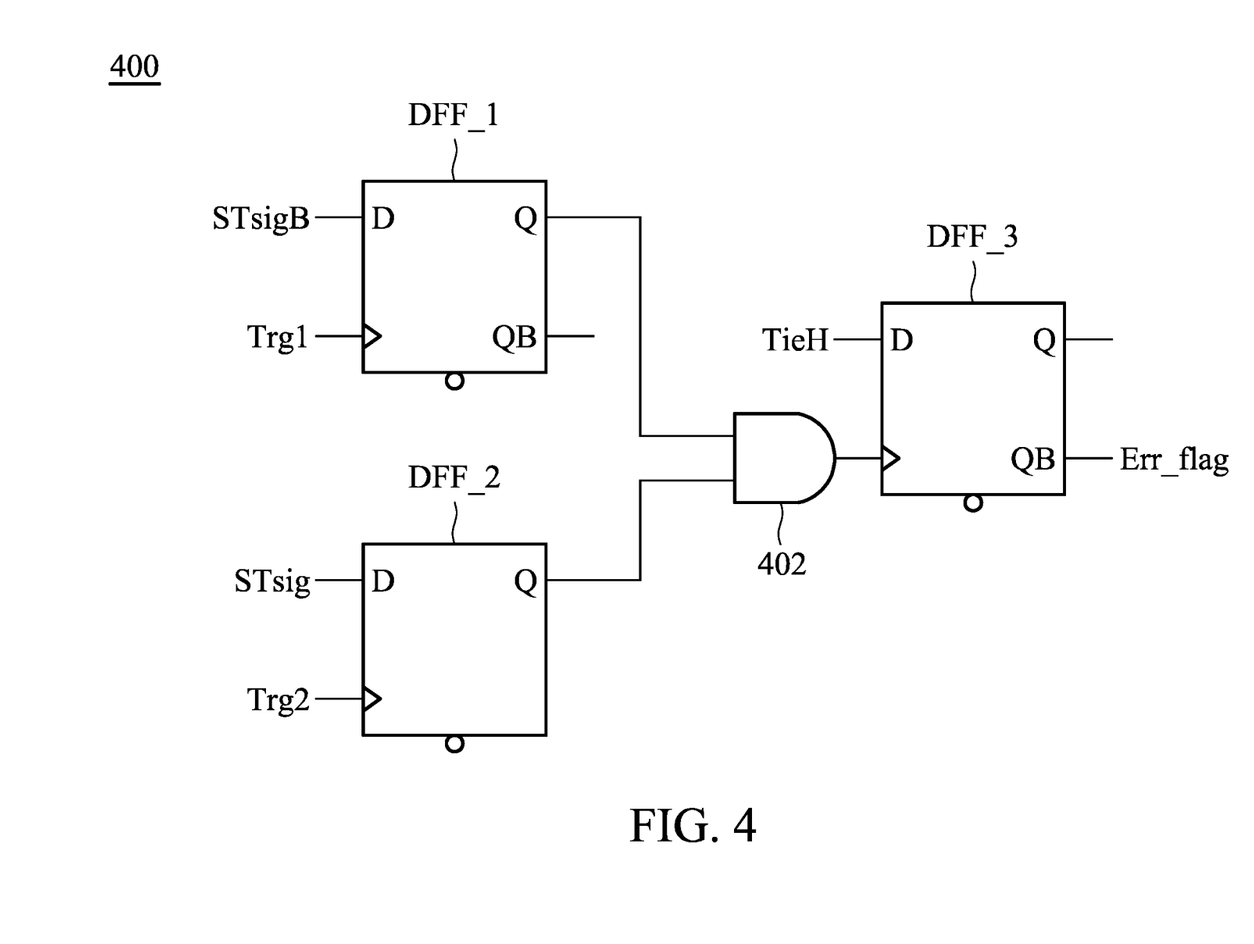
FIG. 4 depicts a self-testing checker 400 in accordance with an exemplary embodiment of the present invention.

FIG. 4 depicts a self-testing checker 400 in accordance with an exemplary embodiment of the present invention, which includes a first D-flip-flop DFF_1, a second D-flip-flop DFF_2, a third D-flip-flop DFF_3, and an AND gate 402. The first D-flip-flop DFF_1 has a D terminal receiving the inverted signal STsigB of the self-testing glitch signal STsig, and a clock terminal receiving the first trigger signal Trg1. The second D-flip-flop DFF_2 has a D terminal receiving the self-testing glitch signal STsig, and a clock terminal receiving the second trigger signal Trg2. The Q terminal of the first D-flip-flop DFF_1 and the Q terminal of the second D-flip-flop DFF_2 are coupled to input terminals of the AND gate 402. The third D-flip-flop DFF_3 has a D terminal tied high (TieH), and a clock terminal receiving an output of the AND gate 402, and a QB terminal showing the error flag Err_falg.

Figure 5:
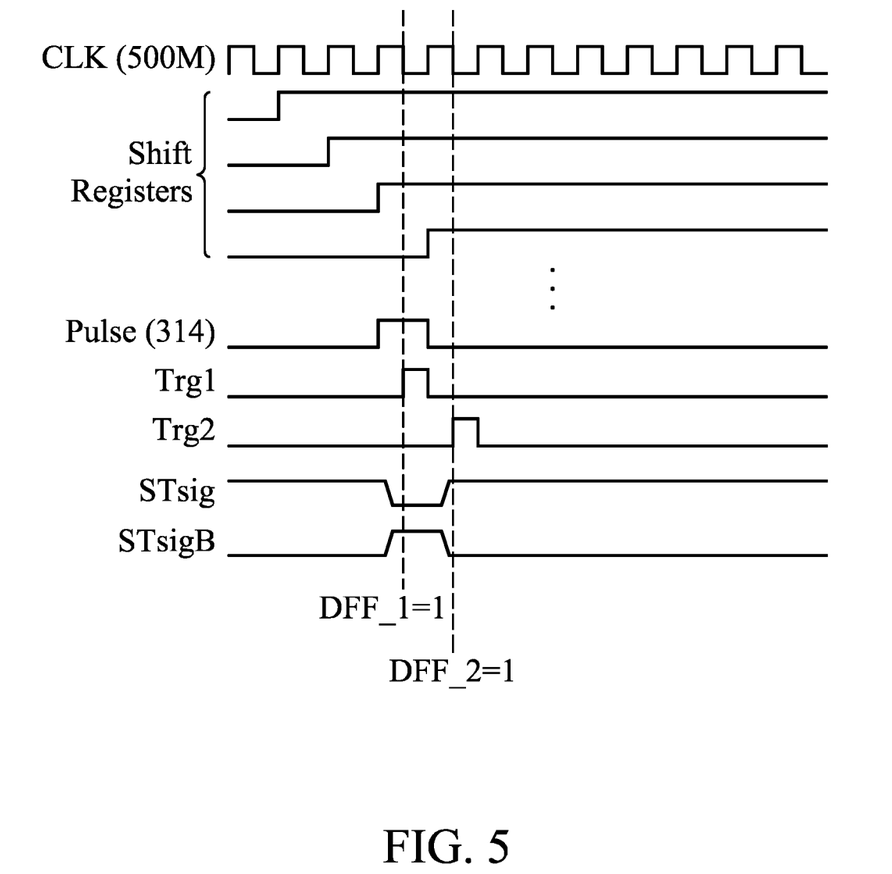
FIG. 5 shows signal waveforms to describe the operations of the self-testing checker 400.

FIG. 5 shows signal waveforms to describe the operation of the self-testing checker 400. The first trigger signal Trg1 and the second trigger signal Trg2 are dependent on the pulse width of the pulse signal 314. When the inverted signal STsigB of the self-testing glitch signal STsig is high (based on the rising Trg1), the Q terminal of the first D-flip-flop DFF_1 is high. When the self-testing glitch signal STsig is high (based on the rising Trg2), the Q terminal of the second D-flip-flop DFF_2 is high. Thus, the output of the AND gate 402 is switched to high. The error flag Err_falg presented at the QB terminal of the third D-flip-flop DFF_3 is de-asserted. This means that the self-testing glitch signal STsig works well. The pulse width of the self-testing glitch signal STsig is set according to the pulse width of the pulse signal 314.

Figure 6:
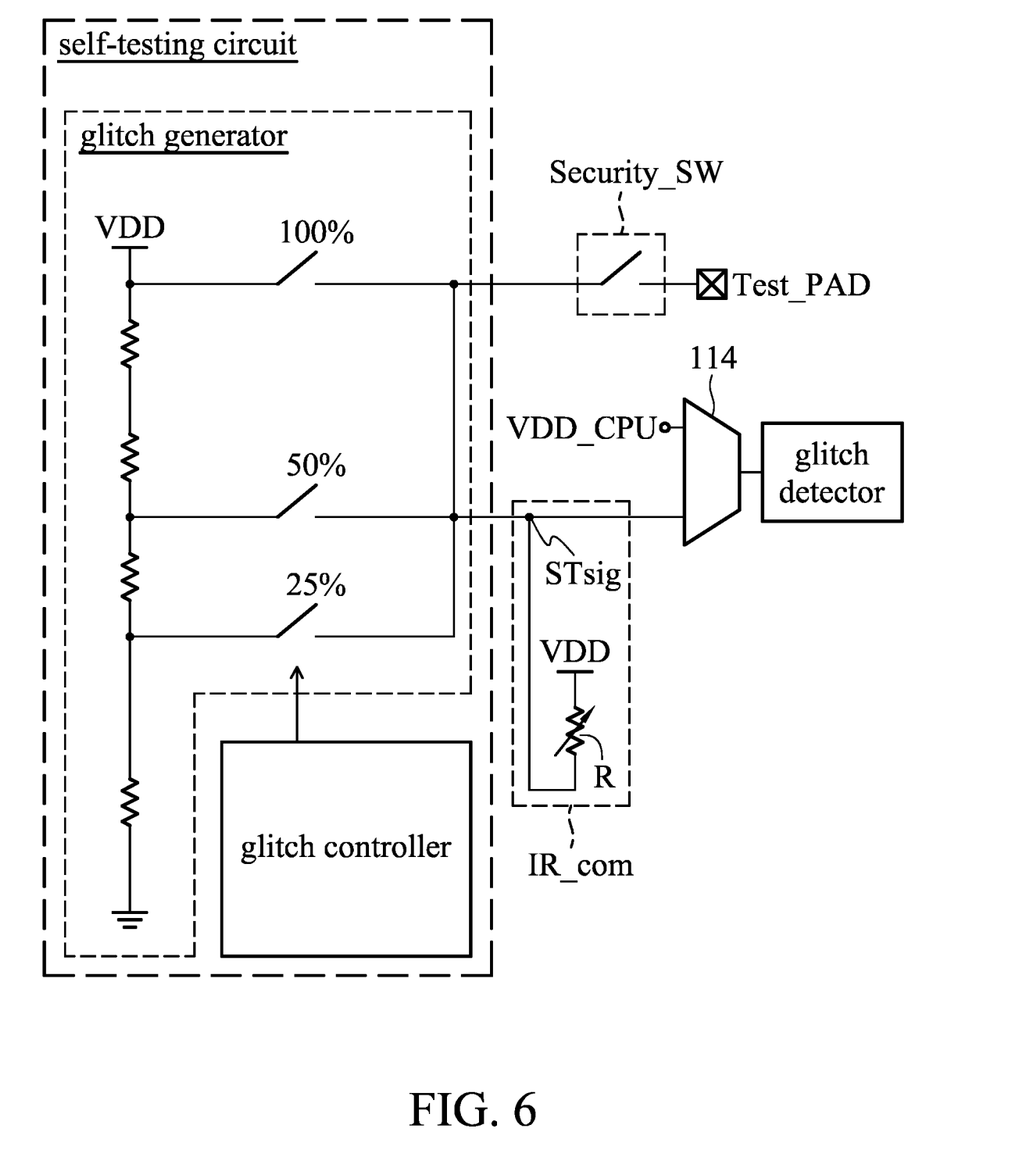
FIG. 6 shows a safe design for a test pad Test_pad.

In an exemplary embodiment, the chip still has a test pad coupled to the glitch detector 106. FIG. 6 shows a safe design for a test pad Test_pad. A security switch Security_SW is coupled between the test pad Test_PAD and a self-testing glitch input terminal (also labeled by STsig) of the multiplexer 114. When an enable signal (EN) of the test pad Test_PAD is de-asserted to disable the test pad Test_PAD, the security switch Security_SW blocks external glitch signals from entering through the test pad Test_PAD.

Figure 7:
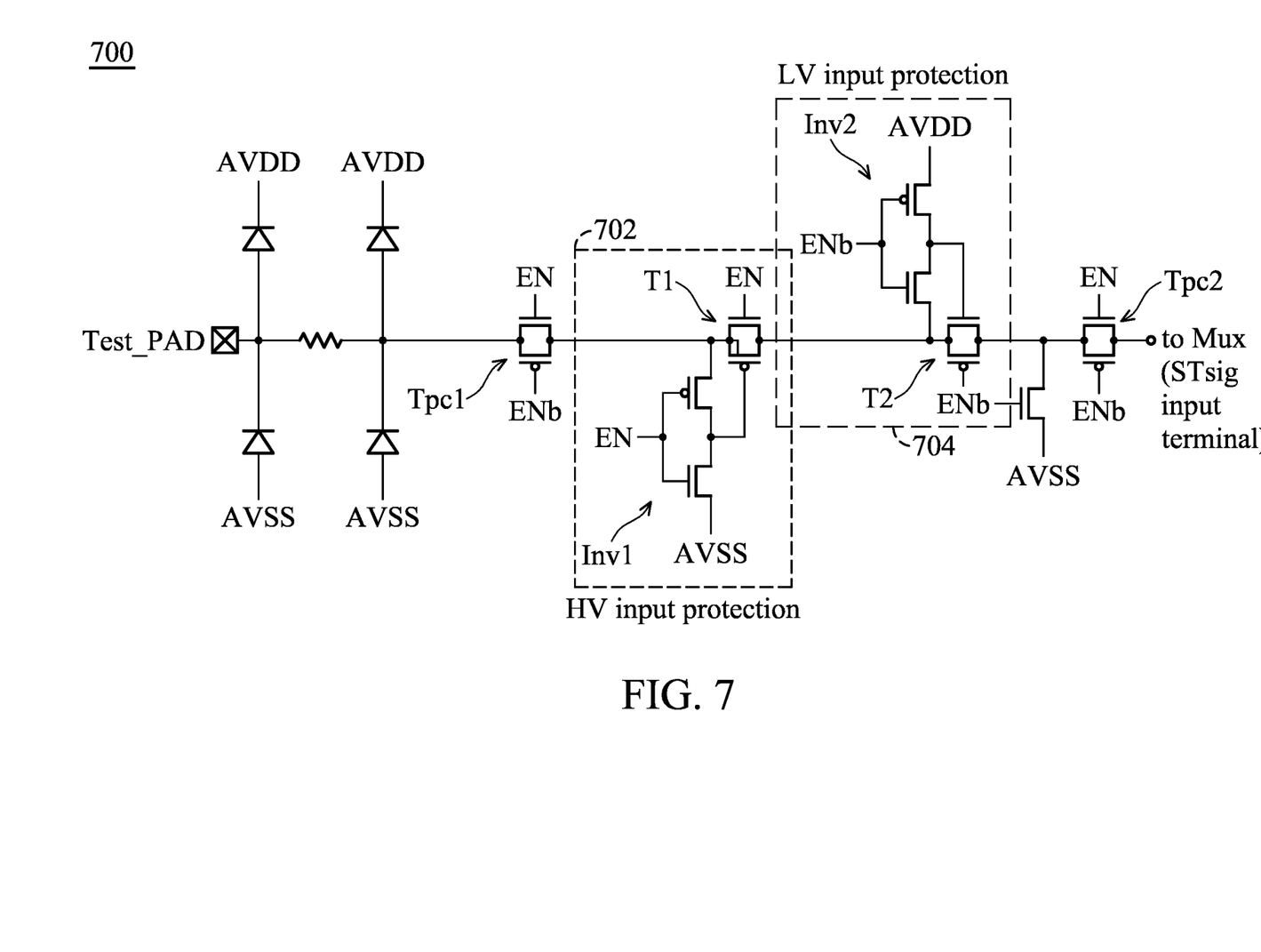
FIG. 7 depicts a security switch 700 in accordance with an exemplary embodiment of the present invention.

FIG. 7 depicts a security switch 700 in accordance with an exemplary embodiment of the present invention, which has a high-voltage input protection circuit 702 and a low-voltage input protection circuit 704.

The high-voltage input protection circuit 702 blocks high-voltage glitch signals (e.g., ones that are higher than the top threshold such as the chip power VDD) from entering through the test pad Test_PAD when the use of the test pad Test_PAD is disabled (EN=0).

The high-voltage input protection circuit 702 has an inverter Inv1 and a protection transition gate T1. The inverter Inv1 has an input terminal receiving the enable signal EN. The power terminal of the inverter Inv1 is coupled to the test pad Test_PAD through a path-control transition gate Tpc1 that is controlled by the enable signal EN and an inverted signal ENb of the enable signal EN. The protection transition gate T1 is coupled between the power terminal of the inverter Inv1 and the self-testing glitch input terminal STsig of the multiplexer 114. The PMOS of the protection transition gate T1 has a gate controlled by an output of the inverter Inv1, and an NMOS of the protection transition gate T1 is controlled by the enable signal EN. The PMOS of the protection transition gate T1 has a well that is coupled to the power terminal of the inverter Inv1.

When the test pad Test_PAD is disabled (EN=0 and ENb=1) and a high-voltage glitch signal (e.g., greater than VDD) is coupled to the test pad Test_PAD, the high-voltage glitch signal is coupled to the gate of the PMOS of the protection transition gate T1 through the PMOS of the inverter Inv1. Thus, the protection transition gate T1 is turned completely off. The high-voltage glitch signal is blocked without being transferred to the self-testing glitch input terminal STsig of the multiplexer 114.

The low-voltage input protection circuit 704 blocks low-voltage glitch signals (e.g., ones that are lower than the bottom threshold such as the chip ground 0V) from entering through the test pad Test_PAD when the use of the test pad Test_PAD is disabled (EN=0).

The low-voltage input protection circuit 704 has an inverter Inv2 and a protection transition gate T2. The inverter Inv2 has an input terminal for receiving an inverted signal ENb of the enable signal EN of the test pad Test_PAD, and the ground terminal of the inverter Inv2 is coupled to the test pad Test_PAD. The protection transition gate T2 has one end coupled to the ground terminal of the inverter Inv2 and another end coupled the self-testing glitch input terminal STsig of the multiplexer 114 through a path-control transition gate Tpc2 (that is controlled by the enable signal EN and the inverted signal ENb of the enable signal EN).

When the test pad Test_PAD is disabled (EN=0 and ENb=1) and a low-voltage glitch signal (e.g., lower than 0V) is coupled to the test pad Test_PAD, the low-voltage glitch signal is coupled to the gate of the NMOS of the protection transition gate T2 through the NMOS of the inverter Inv2. Thus, the protection transition gate T2 is turned completely off. The low-voltage glitch signal is blocked without being transferred to the self-testing glitch input terminal STsig of the multiplexer 114.

As illustrated in FIG. 6, there is an IR compensation circuit IR_com implemented by a variable resistor R. The variable resistor R is coupled between the chip power VDD and the self-testing glitch input terminal STsig of the multiplexer 114 for IR compensation.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip with power-glitch detection and power-glitch self-testing, comprising:
   a processor, having a power terminal configured to receive power;
   a glitch detector, coupled to the power terminal of the processor for power-glitch detection;
   a self-testing circuit, including a glitch generator and a glitch controller controlling the glitch generator to generate a self-testing glitch signal within the chip to test the glitch detector, wherein the glitch controller includes a phase-locked loop that generates a clock signal, shift registers operating according to the clock signal generated by the phase-locked loop, and a pulse generator driven by the shift registers to generate a pulse signal that is sent to the glitch generator to determine a pulse width of the self-testing glitch signal; and
   a frequency meter, configured to monitor malfunctions of the phase-locked loop or the shift registers.

2. The chip as claimed in claim 1, further comprising:
   a multiplexer, coupling the power terminal of the processor to the glitch detector while in a normal mode, and coupling the self-testing glitch signal to the glitch detector while in a power-glitch self-testing mode.

3. The chip as claimed in claim 2, further comprising:
   a test pad; and
   a security switch, coupled between the test pad and a self-testing glitch input terminal of the multiplexer, wherein the self-testing glitch signal is coupled to the multiplexer through the self-testing glitch input terminal,
   wherein when an enable signal of the test pad is de-asserted to disable the test pad, the security switch blocks external glitch signals from entering through the test pad.

4. The chip as claimed in claim 3, wherein the security switch comprises:
   a high-voltage input protection circuit, blocking a high-voltage glitch signal from entering through the test pad when the use of the test pad is disabled, wherein the high-voltage glitch signal is greater than a top threshold.

5. The chip as claimed in claim 4, wherein the high-voltage input protection circuit comprises:
   an inverter, having an input terminal receiving the enable signal, wherein a power terminal of the inverter is coupled to the test pad through a path-control transition gate that is controlled by the enable signal and an inverted signal of the enable signal; and
   a protection transition gate, coupled between the power terminal of the inverter and the self-testing glitch input terminal of the multiplexer,
   wherein a PMOS of the protection transition gate has a gate controlled by an output of the inverter, and an NMOS of the protection transition gate is controlled by the enable signal.

6. The chip as claimed in claim 5, wherein:
   the PMOS of the protection transition gate has a well that is coupled to the power terminal of the inverter.

7. The chip as claimed in claim 3, wherein the security switch comprises:

a low-voltage input protection circuit, blocking a low-voltage glitch signal from entering through the test pad when the use of the test pad is disabled, wherein the low-voltage glitch signal is lower than a bottom threshold.

8. The chip as claimed in claim 7, wherein the low-voltage input protection circuit comprises:
an inverter, having an input terminal receiving an inverted signal of the enable signal of the test pad, wherein a ground terminal of the inverter is coupled to the test pad; and
a protection transition gate, having one end coupled to the ground terminal of the inverter and another end coupled the self-testing glitch input terminal of the multiplexer through a path-control transition gate that is controlled by the enable signal and the inverted signal of the enable signal,
wherein an NMOS of the protection transition gate has a gate controlled by an output of the inverter, and a PMOS of the protection transition gate is controlled by the inverted signal of the enable signal.

9. The chip as claimed in claim 2, further comprising:
a variable resistor, coupled between a power terminal of the chip and a self-testing glitch input terminal of the multiplexer for IR compensation;
wherein the self-testing glitch signal is coupled to the multiplexer through the self-testing glitch input terminal.

10. The chip as claimed in claim 1, wherein:
the glitch generator comprises a voltage divider that provides a plurality of voltage selections, and a plurality of switches for selecting one of the voltage selections as the self-testing glitch signal; and
the glitch controller controls the switches of the glitch generator to turn on a selected switch by the pulse signal.

11. The chip as claimed in claim 1, wherein:
the self-testing glitch signal is fed back to the glitch controller for verification, and the glitch controller presents an error of the self-testing glitch signal by an error flag.

12. The chip as claimed in claim 11, wherein:
the glitch controller generates a first trigger signal and a second trigger signal dependent on the pulse signal to detect a rising transition of an inverted signal of the self-testing glitch signal and a rising transition of the self-testing glitch signal; and
when the rising transition of the inverted signal of the self-testing glitch signal is detected based on the first trigger signal and the rising transition of the self-testing glitch signal is detected based on the second trigger signal, the error flag is de-asserted to show that the self-testing glitch signal works well.

13. The chip as claimed in claim 12, wherein:
the glitch controller has a first D-flip-flop, a second D-flip-flop, a third D-flip-flop, and an AND gate;
the first D-flip-flop has a D terminal receiving the inverted signal of the self-testing glitch signal, and a clock terminal receiving the first trigger signal;
the second D-flip-flop has a D terminal receiving the self-testing glitch signal, and a clock terminal receiving the second trigger signal;
a Q terminal of the first D-flip-flop and a Q terminal of the second D-flip-flop are coupled to input terminals of the AND gate; and the third D-flip-flop has a D terminal tied high, and a clock terminal receiving an output of the AND gate, and a QB terminal showing the error flag.

14. A chip with power-glitch detection and power-glitch self-testing, comprising:
a processor, having a power terminal configured to receive power;
a glitch detector, coupled to the power terminal of the processor for power-glitch detection;
a self-testing circuit, including a glitch generator and a glitch controller controlling the glitch generator to generate a self-testing glitch signal within the chip to test the glitch detector;
a multiplexer, coupling the power terminal of the processor to the glitch detector while in a normal mode, and coupling the self-testing glitch signal to the glitch detector while in a power-glitch self-testing mode;
a test pad; and
a security switch, coupled between the test pad and a self-testing glitch input terminal of the multiplexer, wherein the self-testing glitch signal is coupled to the multiplexer through the self-testing glitch input terminal, wherein when an enable signal of the test pad is de-asserted to disable the test pad, the security switch blocks external glitch signals from entering through the test pad.

15. The chip as claimed in claim 14, wherein the security switch comprises:
a high-voltage input protection circuit, blocking a high-voltage glitch signal from entering through the test pad when the use of the test pad is disabled, wherein the high-voltage glitch signal is greater than a top threshold.

16. The chip as claimed in claim 15, wherein the high-voltage input protection circuit comprises:
an inverter, having an input terminal receiving the enable signal, wherein a power terminal of the inverter is coupled to the test pad through a path-control transition gate that is controlled by the enable signal and an inverted signal of the enable signal; and
a protection transition gate, coupled between the power terminal of the inverter and the self-testing glitch input terminal of the multiplexer,
wherein a PMOS of the protection transition gate has a gate controlled by an output of the inverter, and an NMOS of the protection transition gate is controlled by the enable signal.

17. The chip as claimed in claim 16, wherein:
the PMOS of the protection transition gate has a well that is coupled to the power terminal of the inverter.

18. The chip as claimed in claim 14, wherein the security switch comprises:
a low-voltage input protection circuit, blocking a low-voltage glitch signal from entering through the test pad when the use of the test pad is disabled, wherein the low-voltage glitch signal is lower than a bottom threshold.

19. The chip as claimed in claim 18, wherein the low-voltage input protection circuit comprises:
an inverter, having an input terminal receiving an inverted signal of the enable signal of the test pad, wherein a ground terminal of the inverter is coupled to the test pad; and
a protection transition gate, having one end coupled to the ground terminal of the inverter and another end coupled the self-testing glitch input terminal of the multiplexer through a path-control transition gate that is controlled by the enable signal and the inverted signal of the enable signal, wherein an NMOS of the protection transition gate has a gate controlled by an output of the inverter, and a PMOS of the protection transition gate is controlled by the inverted signal of the enable signal.

20. A chip with power-glitch detection and power-glitch self-testing, comprising:
- a processor, having a power terminal configured to receive power;
- a glitch detector, coupled to the power terminal of the processor for power-glitch detection;
- a self-testing circuit, including a glitch generator and a glitch controller controlling the glitch generator to generate a self-testing glitch signal within the chip to test the glitch detector;
- a multiplexer, coupling the power terminal of the processor to the glitch detector while in a normal mode, and coupling the self-testing glitch signal to the glitch detector while in a power-glitch self-testing mode; and
- a variable resistor, coupled between a power terminal of the chip and a self-testing glitch input terminal of the multiplexer for IR compensation;

wherein the self-testing glitch signal is coupled to the multiplexer through the self-testing glitch input terminal.

* * * * *